United States Patent Office 3,445,545
Patented May 20, 1969

3,445,545
ETHYLENICALLY UNSATURATED DERIVATIVES OF CINNAMIC ACID AND LIGHT RESISTANT POLYMERS PREPARED THEREFROM
Martin Skoultchi, Somerset, N.J., assignor to National Starch and Chemical Corporation, New York, N.Y., a corporation of Delaware
No Drawing. Filed Dec. 12, 1966, Ser. No. 600,795
Int. Cl. C08f 21/00, 3/62; C07c 69/76
U.S. Cl. 260—881                    14 Claims

ABSTRACT OF THE DISCLOSURE

Ethylenically unsaturated derivatives of cinnamic acid and the polymers derived therefrom are prepared by a novel method involving reacting various cinnamic acid intermediates with an ethylenically unsaturated reagent such as glycidyl acrylate or glycidyl methacrylate. The resulting monomers may, thereafter, be homopolymerized or copolymerized with a wide variety of conventional ethylenically unsaturated, i.e. vinyl, monomers. The monomeric derivatives as well as the homo- and copolymers derived therefrom find utility as ultra-violet absorbers thereby providing synthetic plastics with resistance to the degradation which typically results from exposure to ultra-violet radiation.

BACKGROUND OF THE INVENTION

The incorporation of ultra-violet light absorbers in the synthetic plastics derived from high polymers is, of course, a practice known to those skilled in the art. Such ultraviolet absorbers are required since outdoor exposure to natural sunlight or continuous indoor exposure to fluorescent light tends to degrade most plastics and this photodegradation of plastics is, in turn, known to be caused by the ultra-violet portion of light. Such degradation is observable in a plastic as a change in color, such as a yellowing or darkening, and/or by a deterioration of its physical properties, such as its flexural strength and elongation.

In an attempt to overcome these deleterious effects of ultra-violet radiation, the addition of ultra-violet absorbers or stabilizers, such as the phenyl salicylates, the orthohydroxy benzophenones and the alpha-cyano cinnamic acids, has of late become of considerable commercial interest. In order to be effective, such materials should be able to absorb strongly in the ultra-violet range of from 300–400 millimicrons without undergoing any change in structure. In addition, they must possess many other properties such as low color, good compatibility, heat stability, low odor, low volatility, chemical stability and chemical inertness. Furthermore, a complete lack of toxicity as well as the total absence of any migration from the formulated polymer are two important prerequisites of any ultra-violet stabilizers which are to be used in plastics or coatings which are to be employed as wrappers or containers for food products.

One of the methods used for the stabilization of synthetic resins has involved the preparation of ethylenically unsaturated derivatives of suc hknown ultra-violet absorbing compounds as the previously listed phenyl salicylates and ortho-hydroxy benzophenones. These monomeric derivatives are then polymerized with various comonomers so as to result in the preparation of copolymers containing moieties derived from these ethylenically unsaturated ultra-violet absorbing compounds. Such copolymers are thus, in effect, provided with "built-in" protection against the degradative effects of ultra-violet radiation.

SUMMARY OF THE INVENTION

It is, thus, a basic object of this invention to provide a novel class of ethylenically unsaturated derivatives of cinnamic acid, said derivatives being capable of undergoing vinyl type polymerization reactions so as to lead to the preparation of homopolymers and, more particularly, of copolymers which in all cases are capable of containing a substantial proportion of moieties derived from the latter derivatives.

A further object of this invention involves the preparation of polymerizable derivatives of cinnamic acid and their subsequent incorporation into a wide variety of copolymers so as to effectively stabilize such copolymers against the degradative effects of ultra-violet radiation.

DESCRIPTION OF THE PREFERRED EMBODIMENTS

The novel compositions of this invention are the ethylenically unsaturated derivatives of cinnamic acid corresponding to the formula:

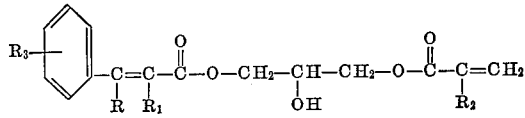

wherein R is a radical selected from the group consisting of hydrogen and phenyl radicals; $R_1$ is a radical selected from the group consisting of cyano, i.e. —CN, and amido, i.e.

radicals; $R_2$ is a radical selected from the group consisting of hydrogen and methyl radicals; and, $R_3$ is a radical selected from the group consisting of hydrogen and alkyl radicals.

As representative of the above described cinnamic acid derivatives of this invention, one may list the following compounds:

3-acryloxy-2-hydroxypropyl (alpha-cyano)cinnamate;
3-acryloxy-2-hydroxypropyl (alpha-cyano-beta-phenyl)-cinnamate;
3-acryloxy-2-hydroxypropyl (alpha-cyano)-p-methyl cinnamate;
3-acryloxy-2-hydroxypropyl (alpha-cyano-beta-phenyl)-p-methyl cinnamate;
3-acryloxy-2-hydroxypropyl (alpha-amido)cinnamate;
3-acryloxy-2-hydroxypropyl (alpha-amido-beta-phenyl) cinnamate;
3-acryloxy-2-hydroxypropyl (alpha-amido)-p-methyl cinnamate;
3-acryloxy-2-hydroxypropyl (alpha-amido-beta-phenyl)-p-methyl cinnamate;
3-methacryloxy-2-hydroxypropyl (alpha-cyano) cinnamate;
3-methacryloxy-2-hydroxyproyl (alpha-cyano-beta-phenyl)cinnamate;
3-methacryloxy-2-hydroxypropyl (alpha-cyano)-p-methyl cinnamate;
3-methacryloxy-2-hydroxypropyl (alpha-cyano-beta-phenyl)-p-methyl cinnamate;
3-methacryloxy-2-hydroxypropyl (alpha-amido) cinnamate;
3-methacryloxy-2-hydroxypropyl (alpha-amido-beta-phenyl)cinnamate;
3-methacryloxy-2-hydroxypropyl (alpha-amido)-p-methyl cinnamate; and
3-methacryloxy-2-hydroxypropyl (alpha-amido-beta-phenyl)-p-methyl cinnamate.

All of the above listed compounds, as well as any others which may correspond to the above definition, are materials which are capable of readily undergoing vinyl type polymerization reactions. They are thus useful for the preparation of copolymers with a wide variety of other vinyl type monomers. These copolymers are especially outstanding in regard to their superior light stability. This improved stability is imparted to these copolymers as a result of the presence therein of the cinnamic acid moiety which is permanently bound into and inherently part of the resulting copolymer molecule as a result of the incorporation therein of the ethylenically unsaturated cinnamic acid derivatives of this invention.

Furthermore, these cinnamic acid derivatives have the desirable characteristic of being almost colorless and, thus, do not impart an initial, undesirable coloring to the plastic materials into which they are incorporated. The latter property is in contrast to the ultra-violet absorbers based upon benzophenone which generally have a yellowish coloration that is imparted to the polymers with which they are admixed. In addition, the active ultra-violet absorbing moiety of these derivatives, i.e. the cinnamic acid moiety, contains no reactive functional groups, e.g. carboxylic acid, phenolic hydroxyl or amino groups, which will limit their usefulness and effectiveness in alkaline systems such as those encountered, for example, in many commercial polyvinyl chloride plastic formulations.

In brief, the synthesis of my novel derivatives is accomplished by the catalyzed reaction of a selected cinnamic acid intermediate, as hereinafter defined, with an ethylenically unsaturated reagent selected from the group consisting of glycidyl acrylate and glycidyl methacrylate.

The cinnamic acid compounds which are applicable for use as intermediates in preparing the novel ethylenically unsaturated cinnamic acid derivatives of this invention correspond to the formula:

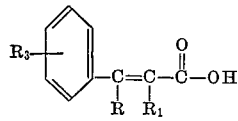

wherein R is a radical selected from the group consisting of hydrogen and phenyl radicals; $R_1$ is a radical selected from the group consisting of cyano, i.e. —CN, and amido, i.e.

radicals; and $R_3$ is a radical selected from the group consisting of hydrogen and alkyl radicals.

As representative of the above described cinnamic acid intermediates, one may list the following compounds:
alpha-cyano cinnamic acid;
alpha-cyano-beta-phenyl cinnamic acid;
alpha-cyano-p-methyl cinnamic acid;
(alpha-cyano-beta-phenyl)-p-methyl cinnamic acid;
alpha-amido cinnamic acid;
alpha-amido-beta-phenyl cinnamic acid;
alpha-amido-p-methyl cinnamic acid;
(alpha-amido-beta-phenyl)-p-methyl cinnamic acid;
(alpha-cyano-beta-phenyl)-o-methyl cinnamic acid;
alpha-cyano-o-methyl cinnamic acid;
(alpha-amido-beta-phenyl)-o-methyl cinnamic acid;
alpha-amido-o-methyl cinnamic acid;
alpha-cyano-p-ethyl cinnamic acid;
(alpha-cyano-beta-phenyl)-p-ethyl cinnamic acid;
alpha-amido-p-ethyl cinnamic acid;
(alpha-amido-beta-phenyl)-p-ethyl cinnamic acid;
alpha-cyano-p-isopropyl cinnamic acid;
(alpha-cyano-beta-phenyl)-p-isopropyl cinnamic acid;
alpha-amido-p-isopropyl cinnamic acid; and
(alpha-amido-beta-phenyl)-p-isopropyl -cinnamic acid.

The preparation of the above described cinnamic acid intermediates, as well as any others which may correspond to the above definition, is well known to those skilled in the art. Thus, for example, they may be prepared by means of a typical Knoevenagel reaction wherein the appropriate benzophenone or benzaldehyde is reacted with ethyl cyano-acetate in the presence of ammonium acetate and acetic acid. Hydrolysis of the resulting ethyl ester with potassium hydroxide in an ethanol/water mixture and acidification thereupon serving to complete the preparation of the cinnamic acid intermediate.

In conducting the reaction which leads to the synthesis of my novel derivatives, the selected ethylenically unsaturated reagent, i.e. either glycidyl acrylate or glycidyl methacrylate, in an equimolar concentration or a concentration amounting to a slight stoichiometric excess in the order of about 10 to 20% over the subsequently added cinnamic acid intermediate, is first ordinarily admixed with the selected catalyst. The latter may be chosen from among any member of the group consisting of the alkali metal hydroxides, such as sodium hydroxide or potassium hydroxide; the salts of alkali metals, such as sodium bicarbonate or sodium chloride; the alkali metal acetates, such as sodium acetate or lithium acetate; and, the quaternary ammonium halides, such as tetramethyl ammonium chloride or tetrabutyl ammonium iodide. These catalysts should be present in concentrations of about 0.1 to 10.0%, as based upon the weight of the ethylenically unsaturated reagent.

Following the initial preparation of the mixture comprising the catalyst and the ethylenically unsaturated reagent, the cinnamic acid intermediate is thereupon added with continued agitation. However, it should be emphasized that the use of this particular sequence is not critical to the process of my invention and may be altered by the practitioner to suit his particular needs. It is, in fact, possible to admix the reactants and the catalyst in any desired sequence. In any event, following the complete admixture of the cinnamic acid intermediate with the catalyst and the ethylenically unsaturated reagent, agitation is continued while the resulting reaction mixture is maintained at a temperature in the range of about 50° to 100° C., and preferably at about 80° to 90° C., for periods of about 6 to 14 hours. Under these conditions, the reaction between the cinnamic acid intermediate and the ethylenically unsaturated reagent will ordinarily proceed at a conversion in the range of about 80 to 95%.

In general, the preparation of the derivatives of this invention may be conducted at any temperature which will be high enough so as to result in an adequate reaction rate. However, inasmuch as some of these derivatives display very little tendency to homopolymerize, they may if desired be prepared at rather high temperatures without any danger of their spontaneous polymerization. In addition, the length of the reaction period will depend, for the most part, upon the specific ethylenically unsaturated reagent which is being utilized. Thus, it is a matter of ordinary preparative experience on the part of the practitioner to determine the precise combination of time and temperature which will be best suited for his synthesis of any of the novel cinnamic acid derivatives coming within the scope of this invention, since the examples herein are merely illustrative.

Upon the completion of the reaction and with subsequent cooling of the reaction vessel to room temperature, the resulting products will ordinarily be in the form of either viscous oils or semi-solids. For most purposes, including any subsequent polymerization reactions, this crude ethylenically unsaturated cinnamic acid derivative can then be used without any further purification being necessary. However, where desired, the relatively small amount of unreacted cinnamic acid intermediate may be removed. Thus, such means as chromatographic separation techniques, as for example with the use of a silica gel column, have been found to yield a product which, by means of saponification equivalent analysis, will indicate a purity of almost 100%, by weight. Other separation techniques, such as aqueous alkali or organic solvent extraction procedures, may also be used where so desired by the practitioner.

It is also possible to prepare the novel derivatives of my invention by reaction in an organic solvent medium. Under these conditions, the cinnamic acid intermediate, the catalyst, and the ethylenically unsaturated reagent may all be dissolved in a non-reactive polar solvent such as acetone, methyl ethyl ketone, butyl acetate, tetrahydrofuran, dimethylformamide or dimethylsulfoxide. The resulting derivative would then be recovered by distilling off the solvent whereupon the crude product could, again, be purified by means of the above noted techniques.

In utilizing my ethylenically unsaturated cinnamic acid derivatives in the preparation of homo- and copolymers, there may be employed any of the usual vinyl polymerization methods which are well known to those skilled in the art and which is particularly suited for the homo- or copolymer whose preparation is desired. Thus, such polymers may be prepared by means of free radical initiated processes utilizing bulk, suspension, solution, or emulsion polymerization techniques; or, they may be prepared by ionic catalysts or by means of stereospecific catalysts such as those of the type developed by Ziegler.

The comonomers which may be utilized together with the above described ethylenically unsaturated cinnamic acid derivatives for the preparation of the ultra-violet stable copolymers of my invention can be any ethylenically unsaturated monomer such, for example, as styrene; alpha-methyl styrene; the acrylic and methacrylic acid esters of aliphatic alcohol such as methyl, ethyl, propyl, butyl, isobutyl, amyl, hexyl, 2-ethyl hexyl, octyl, lauryl and stearyl alcohol; acrylic acid; methacrylic acid; isoprene; acrylamide; acrylonitrile; methacrylonitrile; butadiene; vinyl propionate; dibutyl fumarate; dibutyl maleate; diallyl phthalate; vinylidene chloride; vinyl chloride; vinyl fluoride; vinyl acetate, ethylene; and, propylene, etc. Any of these monomers may be used either alone or in combination with one another together with one or more of the cinnamic acid containing monomers.

In order to effectively withstand the effects of ultraviolet radiation, the copolymers of this invention should contain at least 0.1% by weight, of these ethylenically unsaturated cinnamic acid derivatives. As for the maximum concentration, this will depend, of course, upon the particular comonomer as well as on the specific end use application of the resulting copolymer. However, in most cases a concentration of about 5.0%, by weight, will be fully adequate with economically effective results being obtained with a concentration in the range of about 2.0%. Larger quantities of up to about 10–20% may be used in order to obtain copolymers which are especially suited for use as coatings.

In any event, the homo- and copolymers of my invention, whether prepared by means of bulk, suspension, solution, or emulsion polymerization techniques or by other means, are all characterized by their improved stability to light. This improved stability is fully equivalent, and in many cases superior, to the results obtained when extraneous ultra-violet light absorbers are added to the comparable polymers which do not contain these cinnamic acid derivatives. Moreover, all of the deficiencies which are inherent in the use of these extraneous stabilizers are completely avoided with the products of my invention. Thus, these novel polymeric compositions offer protection against the degradative effects of ultra-violet radiation while eliminating problems of volatility, toxicity and migration.

There are several different techniques by which the homo- and copolymers of this invention may be utilized. Thus, where possible, they may be directly fabricated into such forms as coatings, films, sheeting and other solid shapes which may then be further fabricated into various industrial and consumer articles. On the other hand, these products may also be physically blended with a wide variety of polymers and these blends may then be used as desired. Another approach involves the coating of films or lamination of free films of my compositions to various polymeric substrates, these films thereby serving to protect said substrates from the effects of ultra-violet radiation. Or alternatively, such copolymers may, if compatible, be directly blended with the cellulosics or spar varnishes and thereby impart the advantages of the composition of my invention to these materials.

Illustrative of some widely used plastics which require the use of ultra-violet stabilizers are polyesters, polystyrene, polyvinyl chloride, polyethylene and polyvinylidene chloride. Polyesters, namely, the unsaturated polyesters having ethylenic unsaturation resulting from the presence of alpha, beta-unsaturated carboxylic acids such as maleic and fumaric acid, are typically formulated with monomeric styrene or methyl methacrylate and, in conjunction with fiber glass reinforcement, are employed in the preparation of corrugated and flat sheeting products. The latter are used as roofings, awnings, walk coverings, glazings for windows, skylights, etc. Another large volume outlet for polyester resins is in the construction of plastic boats. Most of these applications require outdoor exposure durability. However, unless they are stabilized, the polyester resins tend to yellow and physically deteriorate. In overcoming this poor stability on the part of the polyester resins, the practitioner need merely introduce one of the above described cinnamic acid monomers together with the styrene or methyl methacrylate monomer, the polymerization catalyst and the unsaturated polyester. The resulting copolymerization reaction will thus result in the homogenous, chemically bonded incorporation of the ultra-violet absorbing moiety.

Similarly, polystryene has been recommended as a plastic for automobile reflector lights and indoor light diffusing louvers. However, polystyrene on exposure to either natural or fluorescent light tends to discolor and crack within a short period of time. By copolymerizing styrene, with one of the cinnamic acid derivatives, the resulting homogenous copolymer is found to be remarkably resistant to both natural and fluorescent light.

Polyvinyl chloride and vinyl chloride copolymer film formulations tend to discolor and become embrittled when exposed to light for prolonged periods of time. Here again, the homogenous copolymers prepared by copolymerizing with a small amount of one of the monomeric cinnamic acid derivatives tend to minimize the undesirable properties of these polymers. These same improvements are also obtained when polythylene copolymers are prepared according the the process of this invention; although ordinarily, polyethylene is very unstable to sunlight, becoming embrittled in a matter of months. The effectiveness of the novel products of this invention is even more noteworthy when viewed in light of the persistent difficulties which have been encountered in attempting to provide polyolefins with prolonged ultra-violet stability.

In addition to the preparation of conventional copolymers which are prepared by the polymerization of one or more of the novel cinnamic acid derivatives with one or more vinyl comonomers, it is also possible to prepare graft copolymers wherein the cinnamic acid derivatives of this invention are polymerized in the presence of previously prepared vinyl polymers such as polyolefins, polyvinyl halides and polyvinyl esters. The resulting graft copolymers are also exceptionally effective in resisting the degradative effects of ultra-violet radiation.

Although glycidyl acrylate and glycidyl methacrylate are the preferred ethylenically unsaturated reagents with regard to the process of this invention, other ethylenically unsaturated reagents may also be effectively utilized therein. Thus, for example, the cinnamic acid intermediates may be reacted either with allyl glycidyl ether or butadiene monoxide, thereby preparing ethylenically unsaturated derivatives of cinnamic acid corresponding to the following formulae:

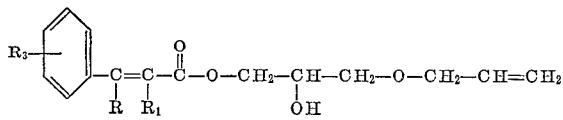

and

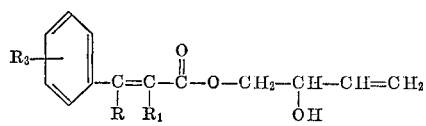

wherein R, $R_1$ and $R_3$ are as previously designated. These monomeric products as well as their homo- and copolymers are also exceptionally effective as ultra-violet absorbers when present in a wide variety of plastics.

The following examples will more clearly illustrate the embodiment of this invention. In these examples, all parts given are by weight unless otherwise noted.

Example I

This example illustrates the preparation of 3-methacryloxy-2-hydroxypropyl (alpha-cyano-beta-phenyl) cinnamate, i.e.

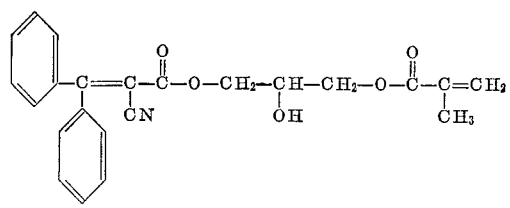

by means of the process of this invention and also demonstrates the improved resistance of a blend of the resulting monomer with polypropylene to the degradative effects of ultra-violet radiation.

A mixture of 156 parts of glycidyl methacrylate, 249 parts of alpha-cyano-beta-phenyl cinnamic acid, 14 parts of lithium acetate and 0.8 parts of p-methoxyphenol was heated, under agitation to a temperature of 75° C. and maintained at that temperature for a period of 9 hours. Upon being cooled to room temperature, the resulting reaction product, which was in the form of a pale yellow viscous oil, was removed and subjected to a base titration. The latter analysis revealed that there was only about 1% of unreacted alpha-cyano-phenyl cinnamic acid present within the reaction product which thereby indicated a conversion of about 98% to the 3-methacryloxy-2-hydroxypropyl (alpha-cyano-beta-phenyl) cinnamate.

Thereafter, 0.5 part of the resulting monomeric product was blended with 100 parts of stabilized polypropylene and the resulting mixture extruded into the form of sheets having a thickness of from ⅛″. Similar procedures were then utilized to prepare sheets of the unstabilized polypropylene as well as of a blend of unstabilized polypropylene and the non-monomeric alpha-cyano-beta-phenyl cinnamic acid which had been utilized as an intermediate in the above described reaction.

Various samples of these extruded sheets were exposed to the equivalent of one year of continuous sunlight by being placed at a distance of 2 feet from a mercury vapor photochemical lamp which was enclosed, together with the coated sheets, in a ventilated, light-proof cabinet for a period of 300 hours.

In evaluating the results of this test, it was noted that the polypropylene sheets containing the monomeric stabilizer of this invention demonstrated greatly improved resistance to the degradative effects of ultra-violet radiation as they successfully retained their flexibility and clarity. On the other hand, the sheets derived from the conventional, unstabilized polypropylene became extremely brittle, discolored and tended to crumble upon being handled while the sheets derived from the blend of unstabilized polypropylene and the non-monomeric, cinnamic acid intermediate became crazed and discolored.

Furthermore, on subjecting the various sheets to a methanol extraction procedure, the non-monomeric alphacyano-beta-phenyl cinnamic acid was totally extracted from the polypropylene while the monomeric cinnamic acid derivative was substantially retained therein. It thus appears that the novel ethylenically unsaturated cinnamic acid derivatives of this invention were extensively grafted onto the polypropylene during the extrusion procedure thereby providing a built-in, permanent protection against the degradative effects of ultra-violet radiation. The latter property is enpecially useful in view of the fact that it is ordinarily extremely difficult to impart permanent ultra-violet stability to polyolefins. Moreover, this phenomenon accounts for the fact that the extruded sheet derived from a mixture of unstabilized polypropylene and the cinnamic acid intermediate did not resist ultra-violet degradation whereas the sheet containing the ethylenically unsaturated derivative of this invention did successfully resist the effects of ultra-violet radiation.

Example II

This example illustrates the preparation of additional ethylenically unsaturated cinnamic acid derivatives, i.e.

(1) 3-acryloxy-2-hydroxypropyl (alpha-cyano) cinnamate

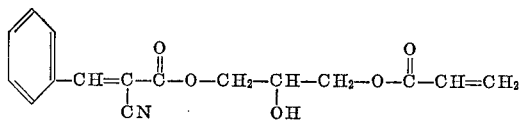

(2) 3-methacryloxy-2-hydroxypropyl (alpha-cyano)-p-methyl cinnamate

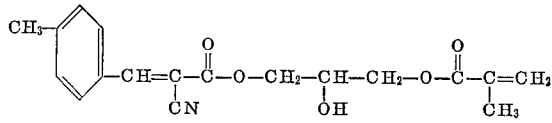

and (3) 3-acryloxy-2-hydroxypropyl (alpha-amido-beta-phenyl) cinnamate

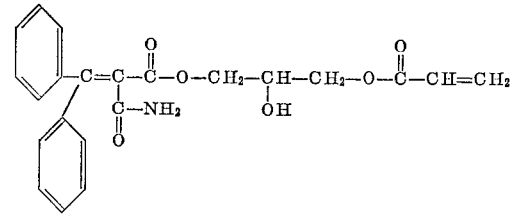

by means of the process of this invention.

The monomeric products of this example were prepared using the general procedure set forth in Example I, hereinabove. The specific reagents and reaction conditions which were utilized are presented in the following table:

| Reagents and reaction conditions | Product number | | |
|---|---|---|---|
| | 1 | 2 | 3 |
| Alpha-cyano cinnamic acid | 249 | | |
| Alpha-cyano-p-methyl cinnamic acid | | 249 | |
| Alpha-amido-beta-phenyl cinnamic acid | | | 249 |
| Glycidyl acrylate | 141 | | 141 |
| Glycidyl methacrylate | | 156 | |
| Tetramethyl ammonium chloride | 7 | | |
| Sodium acetate | | 14 | |
| Lithium acetate | | | 14 |
| p-Methoxyphenol | 0.8 | 0.8 | 0.8 |
| Reaction temperature (° C.) | 50 | 60 | 75 |
| Reaction time (hours) | 11 | 12 | 9 |

The resulting monomeric cinnamic acid deviatives were each, respectively, subjected to the evaluation procedure set forth in Example I and, in each instance, the monomeric products demonstrated superior resistance to the degradative effects of ultra-violet radiation.

Example III

This example illustrates the preparation of a novel homopolymer of this invention by means of a solution polymerization technique.

A tetrahydrofuran lacquer of a 3-methacryloxy-2-hydroxypropyl (alpha-cyano-beta-phenyl) cinnamate homopolymer was prepared by charging the following ingredients into a reactor equipped with a reflux condenser, as well as means for mechanical agitation.

| | Parts |
|---|---|
| 3-methacryloxy-2-hydroxypropyl (alpha-cyano-beta-phenyl) cinnamate (as prepared in Example I) | 100 |
| Tetrahydrofuran | 150 |
| Benzoyl peroxide | 0.5 |

Under agitation, the above mixture was then refluxed at 65° C. for a period of 6 hours whereupon it was allowed to cool and discharged from the reactor. The resulting lacquer had a resin solids content of 40%, by weight, indicating a conversion of about 100%. Furthermore, the ultra-violet spectra of the monomer and the homopolymer were identical in the 250–400 millimicron range thereby indicating the retention, in the homopolymer, of the active ultra-violet absorbing structure which is present in the monomer.

Films derived fro mthe resulting lacquer exhibited resistance to the degradative effects of ultra-violet radiation after prolonged outdoor exposure, thereby demonstrating the effectiveness of the homopolymer as an ultra-violet stabilizer.

Example IV

This example illustrates the preparation of one of the novel copolymers of this invention by means of a pearl polymerization technique.

The following ingredients were charged into a reactor equipped with a reflux condenser, a nitrogen inlet and means for mechanical agitation.

| | Parts |
|---|---|
| Ethyl methacrylate | 100 |
| 3-acryloxy-2-hydroxypropyl (alpha-cyano) cinnamate (as prepared in Example II) | 1.0 |
| 88% hydrolyzed, medium viscosity grade polyvinyl alcohol | 0.2 |
| Benzoyl peroxide | 0.3 |
| Water | 150 |

Under agitation, and while passing nitrogen gas through the reactor, the above mixture was heated to 70–75° C. After a short induction period of about 30 minutes, polymerization was initiated and the heating was then continued for an additional 8 hours. The resulting copolymer pearls were then washed, filtered off from the reaction mass and dried.

Using some of the above described copolymer pearls, a solution in ethyl acetate was prepared having a resin solids content of 50%, by weight. Upon exposure to an ultra-violet source, films cast from the latter lacquer exhibited excellent resistance to ultra-violet radiation.

Example V

This example illustrates the preparation of another of the novel copolymers of this invention by means of a solution polymerization technique.

A toluene lacquer of a styrene:3-methacryloxy-2-hydroxypropyl (alpha-cyano)-p-methyl cinnamate copolymer was prepared by charging the following ingredients into a reactor equipped with a reflux condenser as well as with means for mechanical agitation.

| | Parts |
|---|---|
| 3-methacryloxy-2-hydroxypropyl (alpha-cyano)-p-methyl cinnamate (as prepared in Example II) | 0.5 |
| Styrene | 100 |
| Tertiary butyl hydroperoxide | 0.5 |
| Toluene | 150 |

Under agitation, the above mixture was refluxed at 110° C. for a period of 6 hours whereupon it was allowed to cool and discharged from the reactor. The resulting lacquer had a resin solids content of 37.5%, by weight, indicating a conversion of 94%.

Films derived from this lacquer demonstrated greatly improved resistance to the degradative effects of ultra-violet radiation as compared with comparable films derived from a similarly prepared styrene homopolymer lacquer.

Example VI

This example illustrates the preparation of one of the novel copolymers of this invention by means of an aqueous emulsion polymerization technique.

An aqueous latex of a 90:10:0.5 vinylidene chloride: ethyl acrylate:3-acryloxy-2-hydroxypropyl (alpha-amido-beta-phenyl) cinnamate terpolymer was prepared by charging the following ingredients into a reactor equipped with a reflux condenser as well as with means for mechanical agitation.

| | Parts |
|---|---|
| Vinylidene chloride | 90 |
| Ethyl acrylate | 10 |
| 3-acryloxy-2-hydroxpropyl (alpha-amido-beta-phenyl) cinnamate (as prepared in Example II) | 0.5 |
| Sodium lauryl sulfate | 1.5 |
| Sodium dodecyl benzene sulfonate | 2.0 |
| Sodium bicarbonate | 0.3 |
| Sodium bisulfite | 0.2 |
| Ammonium persulfate | 0.25 |
| Water | 100 |

The above mixture was refluxed at 33–55° C. for a period of 5 hours thereby resulting in a latex with a resin solids content of 50%, by weight.

The latex was then used in the preparation of films having a wet thickness of 3.0 mils, which were cast upon sheets of white paper. Upon being exposed to an ultra-violet source, these films which had been prepared from a novel copolymer of this invention exhibited excellent resistance to the degradative effects of ultra-violet radiation.

Summarizing, this invention is thus seen to provide a novel class of ethylenically unsaturated cinnamic acid derivatives which may be incorporated into a wide variety of copolymers; the resulting copolymers being characterized by their outstanding resistance to the degradative effects of ultra-violet radiation. Variations may be made in proportions, procedures and materials without departing from the scope of this invention as defined by the following claims.

What is claimed is:

1. An ethylenically unsaturated derivative of cinnamic acid corresponding to the formula:

$$R_3-\underset{}{\bigcirc}-\underset{R}{\overset{}{C}}=\underset{R_1}{\overset{}{C}}-\overset{O}{\overset{\|}{C}}-O-CH_2-\underset{OH}{\overset{}{C}H}-CH_2-O-\overset{O}{\overset{\|}{C}}-\underset{R_2}{\overset{}{C}}=CH_2$$

wherein R is selected from the group consisting of hydrogen and phenyl radicals; $R_1$ is selected from the group consisting of cyano and amido radicals; $R_2$ is selected from the group consisting of hydrogen and methyl radicals; and, $R_3$ is selected from the group consisting of hydrogen and alkyl radicals.

2. The ethylenically unsaturated derivative of claim 1 selected from the group consisting of:
  3-acryloxy-2-hydroxypropyl (alpha-cyano)cinnamate;
  3-acryloxy-2-hydroxypropyl (alpha-cyano-beta-phenyl)cinnamate;
  3-acryloxy-2-hydroxypropyl (alpha-cyano)-p-methyl cinnamate;
  3-acryloxy-2-hydroxypropyl (alpha-cyano-beta-phenyl)-p-methyl cinnamate;

3-acryloxy-2-hydroxypropyl (alpha-amido)cinnamate;
3-acryloxy-2-hydroxypropyl (alpha-amido-beta-phenyl)cinnamate;
3-acryloxy-2-hydroxypropyl (alpha-amido)-p-methyl cinnamate;
3-acryloxy-2-hydroxypropyl (alpha-amido-beta-phenyl)-p-methyl cinnamate;
3-methacryloxy-2-hydroxypropyl (alpha-cyano)cinnamate;
3-methacryloxy-2-hydroxypropyl (alpha-cyano-beta-phenyl)cinnamate;
3-methacryloxy-2-hydroxypropyl (alpha-cyano)-p-methyl cinnamate;
3-methacryloxy-2-hydroxypropyl (alpha-cyano-beta-phenyl)-p-methyl cinnamate;
3-methacryloxy-2-hydroxypropyl (alpha-amido)cinnamate;
3-methacryloxy-2-hydroxypropyl (alpha-amido-beta-phenyl)cinnamate;
3-methacryloxy-2-hydroxypropyl (alpha-amido)-p-methyl cinnamate; and
3-methacryloxy-2-hydroxypropyl (alpha-amido-beta-phenyl)-p-methyl cinnamate.

3. A process for preparing ethylenically unsaturated derivatives of cinnamic acid corresponding to the formula:

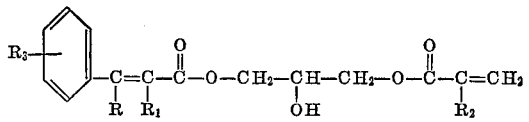

wherein R is selected from the group consisting of hydrogen and phenyl radicals; $R_1$ is selected from the group consisting of cyano and amido radicals; $R_2$ is selected from the group consisting of hydrogen and methyl radicals; and, $R_3$ is selected from the group consisting of hydrogen and alkyl radicals, said process comprising reacting: (1) a cinnamic acid intermediate corresponding to the formula:

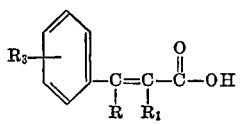

wherein R is selected from the group consisting of hydrogen and phenyl radicals; $R_1$ is selected from the group consisting of cyano and amido radicals; and, $R_3$ is selected from the group consisting of hydrogen and alkyl radicals; with (2) an ethylenically unsaturated reagent selected from the group consisting of glycidyl acrylate and glycidyl methacrylate; said reaction being conducted at elevated temperatures and in the presence of a catalyst selected from the group consisting of alkali metal hydroxides, the salts of alkali metals, the alkali metal acetates and the quaternary ammonium halides.

4. A composition comprising a homopolymer of an ethylenically unsaturated derivative of cinnamic acid corresponding to the formula:

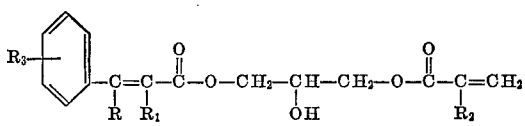

wherein R is selected from the group consisting of hydrogen and phenyl radicals; $R_1$ is selected from the group consisting of cyano and amido radicals; $R_2$ is selected from the group consisting of hydrogen and methyl radicals; and, $R_3$ is selected from the group consisting of hydrogen and alkyl radicals.

5. The homopolymer of claim 4, wherein said ethylenically unsaturated derivative is selected from the group consisting of:

3-acryloxy-2-hydroxypropyl (alpha-cyano)cinnamate;
3-acryloxy-2-hydroxypropyl (alpha-cyano-beta-phenyl)cinnamate;
3-acryloxy-2-hydroxypropyl (alpha-cyano)-p-methyl cinnamate;
3-acryloxy-2-hydroxypropyl (alpha-cyano-beta-phenyl)-p-methyl cinnamate;
3-acryloxy-2-hydroxypropyl (alpha-amido) cinnamate;
3-acryloxy-2-hydroxypropyl (alpha-amido) cinnamate;
3-acryloxy-2-hydroxypropyl (alpha-amido-beta-phenyl)cinnamate;
3-acryloxy-2-hydroxypropyl (alpha-amido)-p-methyl cinnamate;
3-acryloxy-2-hydroxypropyl (alpha-amido-beta-phenyl)-p-methyl cinnamate;
3-methacryloxy-2-hydroxypropyl (alpha-cyano) cinnamate;
3-methacryloxy-2-hydroxypropyl (alpha-cyano-beta-phenyl)cinnamate;
3-methacryloxy-2-hydroxypropyl (alpha-cyano)-p-methyl cinnamate;
3-methacryloxy-2-hydroxypropyl (alpha-cyano-beta-phenyl)-p-pmethyl cinnamate;
3-methacryloxy-2-hydroxypropyl (alpha-amido) cinnamate;
3-methacryloxy-2-hydroxypropyl (alpha-amido-beta-phenyl)cinnamate;
3-methacryloxy-2-hydroxypropyl (alpha-amido)-p-methyl cinnamate; and
3-methacryloxy-2-hydroxypropyl (alpha-amido-beta-phenyl)-p-methyl cinnamate.

6. A method for preparing homopolymers resistant to the degradative effects of ultra-violet radiation which comprises heating, in the presence of a free radical initiator, an ethylenically unsaturated derivative of cinnamic acid corresponding to the formula:

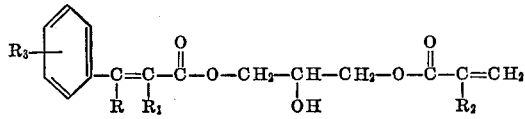

wherein R is selected from the group consisting of hydrogen and phenyl radicals; $R_1$ is selected from the group consisting of cyano and amido radicals; $R_2$ is selected from the group consisting of hydrogen and methyl radicals; and, $R_3$ is selected from the group consisting of hydrogen and alkyl radicals.

7. A composition comprising a polymer of at least one ethylenically unsaturated monomer together with at least one ethylenically unsaturated derivative of cinnamic acid corresponding to the formula:

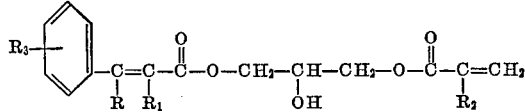

wherein R is selected from the group consisting of hydrogen and phenyl radicals; $R_1$ is selected from the group consisting of cyano and amido radicals; $R_2$ is selected from the group consisting of hydrogen and methyl radicals; and, $R_3$ is selected from the group consisting of hydrogen and alkyl radicals.

8. The composition of claim 7, wherein said ethylenically unsaturated monomer is selected from the group consisting of styrene, alpha-methyl styrene, the acrylic and methacrylic esters of aliphatic alcohols, acrylic acid, methacrylic acid, isoprene, acrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

9. The composition of claim 7, wherein said ethylenically unsaturated derivative of cinnamic acid is present in a proportion of at least about 0.1%, by weight.

10. A composition in accordance with claim 7, in which ethyl methacrylate is polymerized with 3-acryloxy-2-hydroxypropyl (alpha-cyano)cinnamate.

11. A composition in accordance with claim 7, in which styrene is polymerized with 3-methacryloxy-2-hydroxypropyl (alpha-cyano)-p-methyl cinnamate.

12. A composition in accordance with claim 7, in which vinylidene chloride and ethyl acrylate are polymerized with 3-acryloxy-2-hydroxypropyl (alpha-amido-beta-phenyl)cinnamate.

13. A method for preparing polymers resistant to the degradative effects of ultra-violet radiation which comprises heating, in the presence of a free radical initiator, at least one ethylenically unsaturated monomer together with at least one ethylenically unsaturated derivative of cinnamic acid corresponding to the formula:

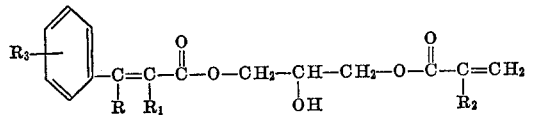

wherein R is selected from the group consisting of hydrogen and phenyl radicals; $R_1$ is selected from the group consisting of cyano and amido radicals; $R_2$ is selected from the group consisting of hydrogen and methyl radicals; and $R_3$ is selected from the group consisting of hydrogen and alkyl radicals.

14. A composition comprising a graft polymer of at least one vinyl polymer together with at least one ethylenically unsaturated derivative of cinnamic acid corresponding to the formula:

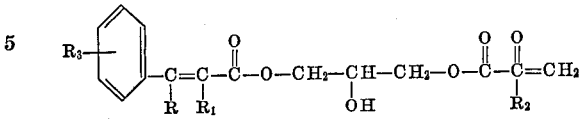

wherein R is selected from the group consisting of hydrogen and phenyl radicals; $R_1$ is selected from the group consisting of cyano and amido radicals; $R_2$ is selected from the group consisting of hydrogen and methyl radicals; and $R_3$ is selected from the group consisting of hydrogen and alkyl radicals.

References Cited
UNITED STATES PATENTS

| | | | |
|---|---|---|---|
| 2,846,410 | 8/1958 | Armitage et al. | 260—89.3 |
| 3,074,971 | 1/1963 | Strobel et al. | 260—465 |
| 3,257,664 | 6/1966 | Leubner et al. | 260—89.3 |

MURRAY TILLMAN, *Primary Examiner.*

J. T. GOOLKASIAN, *Assistant Examiner.*

U.S. Cl. X.R.

260—45.85, 78.5, 80.81, 82.3, 85.5, 88.7, 89.3, 89.5, 465, 471, 885